US00RE44690E

(19) United States
(12) Reissued Patent
Sollami

(10) Patent Number: US RE44,690 E
(45) Date of Reissued Patent: Jan. 7, 2014

(54) BIT HOLDERS AND BIT BLOCKS FOR ROAD MILLING, MINING AND TRENCHING EQUIPMENT

(76) Inventor: Phillip A. Sollami, Herrin, IL (US)

(21) Appl. No.: 11/264,811

(22) Filed: Nov. 1, 2005

Related U.S. Patent Documents

Reissue of:

(64) Patent No.: 6,585,326
Issued: Jul. 1, 2003
Appl. No.: 10/119,242
Filed: Apr. 9, 2002

U.S. Applications:

(60) Division of application No. 09/500,983, filed on Feb. 15, 2000, now Pat. No. 6,371,567, which is a continuation-in-part of application No. 09/273,690, filed on Mar. 22, 1999, now Pat. No. 6,364,420.

(51) Int. Cl.
*E21C 35/18* (2006.01)

(52) U.S. Cl.
USPC ..... 299/104; 299/107

(58) Field of Classification Search
USPC ..... 299/102–107, 110–111
See application file for complete search history.

(56) References Cited

U.S. PATENT DOCUMENTS

| | | | | |
|---|---|---|---|---|
| 3,865,437 | A * | 2/1975 | Crosby | 299/107 |
| 4,084,856 | A * | 4/1978 | Emmerich et al. | 299/104 |
| 4,337,980 | A * | 7/1982 | Krekeler | 299/102 |
| 4,844,550 | A * | 7/1989 | Beebe | 299/107 |
| 5,088,797 | A * | 2/1992 | O'Neill | 299/104 |
| 5,106,166 | A * | 4/1992 | O'Neill | 299/104 |
| 5,302,005 | A * | 4/1994 | O'Neill | 299/87.1 |
| 5,725,283 | A * | 3/1998 | O'Neill | 299/104 |
| D420,013 | S * | 2/2000 | Warren et al. | D15/21 |
| 6,176,552 | B1 * | 1/2001 | Topka et al. | 299/104 |
| 6,244,665 | B1 * | 6/2001 | Bise et al. | 299/106 |
| 6,331,035 | B1 | 12/2001 | Montgomery | |

* cited by examiner

*Primary Examiner* — Sunil Singh
(74) *Attorney, Agent, or Firm* — Patnaude & Videbeck

(57) ABSTRACT

An improved bit holder with its mating bit block is disclosed utilizing a slight taper in the bit block bore, and a tapered shank on the bit holder that includes a second larger diameter tapered distal segment that combines with an axially oriented slot through the side wall of the bit holder shank to allow a substantially larger interference fit between the distal tapered shank segment and the bit block bore than previously known. When inserting the bit holder in the bit block bore, the distal first tapered segment resiliently collapses to allow insertion of that segment into the bit block bore. A second shank tapered portion axially inwardly of the first distal tapered portion. The dual tapered shank allows the insertion of the bit holder in the bit block with an interference fit that provides a secure mounting of the bit holder in the bit block.

14 Claims, 7 Drawing Sheets

BIT HOLDERS AND BIT BLOCKS FOR ROAD MILLING, MINING AND TRENCHING EQUIPMENT

Matter enclosed in heavy brackets [ ] appears in the original patent but forms no part of this reissue specification; matter printed in italics indicates the additions made by reissue.

This application is a divisional of Ser. No. 09/500,983 filed Feb. 15, 2000, now U.S. Pat. No. 6,371,567, which is a continuation in part of Ser. No. 09/273,690 filed on Mar. 22, 1999, now U.S. Pat. No. 6,364,420.

This invention relates generally to road surface removal or reclaimer-stabilizer equipment and mining equipment, and more particularly, to cutter bit holders and bit blocks used in such road milling, mining, and trenching equipment.

BACKGROUND OF THE INVENTION

Cutter bits are utilized in road, off-road and mining machinery on the perimeter and across the width of a rotary drum or on the outside of a continuous chain or the like where the bits are moved through an orbit which is intercepted by the face of the material being removed or recycled. Road milling equipment removes the defective surface of a road and smooths the top of all or selected portions of the road surface. The bits include a tip and a shank. The shank is received and may axially rotate in a bit holder which is secured onto a bit block that, in turn, is mounted on the drum. Each of the bits has a hardened tip, preferably made of tungsten carbide or such other hardened material that acts to remove a portion of the surface it contacts. By using a sufficient number of these bits around the outer surface of a rotating drum, a large amount of surface may be worked. Any surface being worked generally has a hardness which can be measured or anticipated prior to the removal operation. However, such road surfaces, or surfaces being removed have hardened irregularities running therethrough. The toughness or hardness of the irregularities may result in the breakage of the bits and holders as they are being run over such irregularities.

Additionally, a need has developed for providing ease of removability of bits in their bit holders, especially when the bit becomes worn and in need of replacement. U.S. Pat. No. 5,374,111 discloses an undercut flange at the bottom of a base of a bit that allows a pry bar to be wedged between that flange and the top of the bit block (no bit holder in this patent) to help remove a bit from a bit block. It would be desirable to provide a more efficient means for allowing the removal of a bit from a bit holder or a bit block.

Additionally, tightening a small fastener on the bottom of a bit holder to hold it in the bit block concentrates friction forces on a small area of the nut top face and the bottom of the bit block. It would be desirable to spread those friction forces over a larger area and avoid the use of a nut to retain the bit holder on the bit block.

Further, a need has developed for a truly quick-change type of bit holder that may easily and quickly be both inserted in the bit block and removed therefrom.

It is, therefore, an object of the present invention, generally stated, to provide an improved means for quickly mounting and/or removing a bit holder from its associated bit block.

Another object of the present invention is the provision of an improved means for mounting a bit holder in a bit block without the use of retaining nuts, clips or the like.

A further object of the invention is the provision of retaining a bit holder in a bit block by means of a resilient interference fit between the holder and the block.

Another object of the invention is the provision of an improved means for providing for breakage of inexpensive replaceable parts when road resurfacing equipment and mining equipment bits encounter very hard irregularities in the surface being milled or mined.

BRIEF DESCRIPTION OF THE DRAWINGS

The features of the present invention which are believed to be novel are set forth with particularity in the attached claims. The invention may best be understood by reference to the following description taken in conjunction with the accompanying drawings in which like numerals refer to like parts, and in which:

DETAILED DESCRIPTION OF THE PREFERRED EMBODIMENTS

Figure 1:
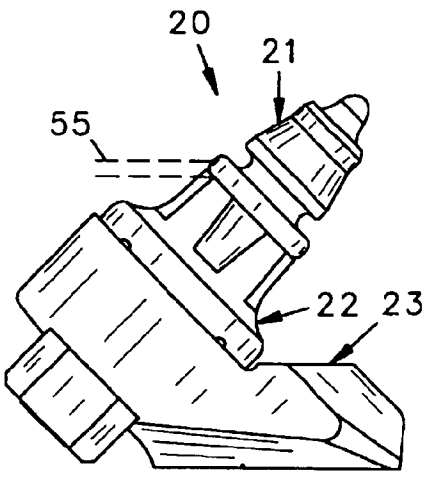
FIG. 1 is a side elevational view of a bit block, bit holder and bit assembly constructed in accordance with the present invention.
Figure 2:
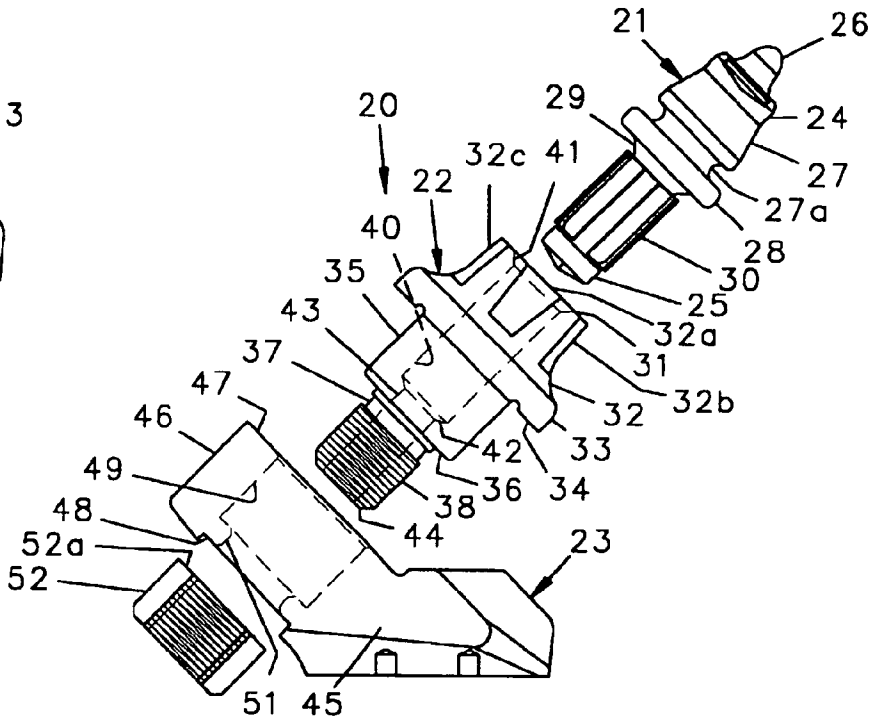
FIG. 2 is an exploded side elevational view of the assembly shown in FIG. 1.

Referring to FIGS. 1-2, a bit mounting assembly, generally indicated at 20, constructed in accordance with the present invention, includes a bit, generally indicated at 21, which is mounted on a bit holder, generally indicated at 22, which, in turn, is secured on a bit block, generally indicated at 23. The bit block 23 is one of a plurality of such blocks mounted around the outside of the generally circular drum (not shown) or on a movable chain or track (not shown).

Referring to FIG. 2, the bit, generally indicated at 21, includes a forward end 24, and a shank 25 or rear end thereof. The forward end 24 includes a hardened nose 26, preferably made of tungsten carbide or a like material, a middle tapered portion 27 including a reduced diameter area 27a and a bottom flange portion 28 which is made so as to rest on the bit holder, generally indicated at 22. A spring steel retaining clip 30 is positioned over the shank 25 of bit 21 and is shaped so that when the bit 21 is inserted in the bit holder 22, the retaining clip 30 will secure the bit therein while allowing it to rotate from external forces.

The bit holder 22, constructed in accordance with the present invention, includes a generally flat annular leading surface 31 on which the rear side of the bit flange 28 rests when inserted therein. Adjacent the annular leading surface 31 is a middle or tapered portion 32 that ends in an enlarged flange portion 33. In the preferred embodiment of the invention, a plurality of notches, flats or indents 32a-d extend radially inwardly of the middle tapered portion from top surface 31 toward the flange 33. The back side 34 of flange 33 is an annular flat surface which rests on the bit block 23 when mounted thereon, and includes one aspect of the present invention to be discussed below. Rearwardly adjacent the flange portion 33 is a reduced diameter cylindrical shank portion 35 and a shoulder portion 36 which may vary in length depending on its function, an undercut portion 37 is next to the shoulder portion 36, and the bit holder terminates in a threaded portion 38 adjacent the distal end 44 thereof. If the nose 26 of bit 21 hits a hard discontinuity, bit 21 will fail first, the bit holder in this embodiment may be engineered to fail next across reduced diameter section 37. The configuration allows the bit holder to tumble out of bit block bore 49 after failure.

Also shown in FIG. 2 is a bore 40 that extends axially through bit holder 22 from a countersink 41 in communication with the front face 31, through the tapered portion 32, the flange portion 33 and a substantial portion of the shank 35, 36 where it narrows at chamfer 42 to a smaller diameter bore 43. Bore 43 extends the remainder of the bit holder to its distal end 44, or it may be increased in diameter partly along its length to decrease the cross sectional reduced diameter section 37, if desired. The length of the bore 40 is determined partly by the length of the shank 25 on bit 21. The shank 25 fits within bore 40, and is retained therein by the spring steel retainer 30. If the bit 21 should break at reduced diameter portion 29 adjacent the bottom flanged portion 28, a rod, punch, etc. (not shown) may be inserted into the bottom of the bore to push the shank out of the holder.

The bit block 23 consists of a base portion 45 that mounts to a drum, chain, or track (not shown) and an angled bit holder mounting portion 46 extending from the base 45 that includes a top face 47, and a bottom recessed slot 48 which provides the opposing ends for a bore 49, which may be tapered, and a reduced bridging portion 51 extending from a bottom of bore 49 to the recessed slot 48. Bore 49 is sized to receive the cylindrical shank 35 of the bit holder 22 with the annular flat surface 34 on the bottom of the flange portion 33 resting on the top surface 47 of the bit block mounting portion 46. In one important aspect of the present invention, the surface area of contact between flange bottom 34 and bit block top 47 is much greater than the surface area of contact between the top 52a of nut 52 and nut contacting surface on slot 48 and will be discussed in greater detail below. The threaded portion 38 adjacent the distal end 44 of bit holder 22 extends through the reduced passageway 51 where a nut 52 may be threaded thereon by rotating the bit holder until its top surface 52a engages the surface of the recessed slot 48 to retain the bit holder 22 on the bit block 23.

Figure 4:
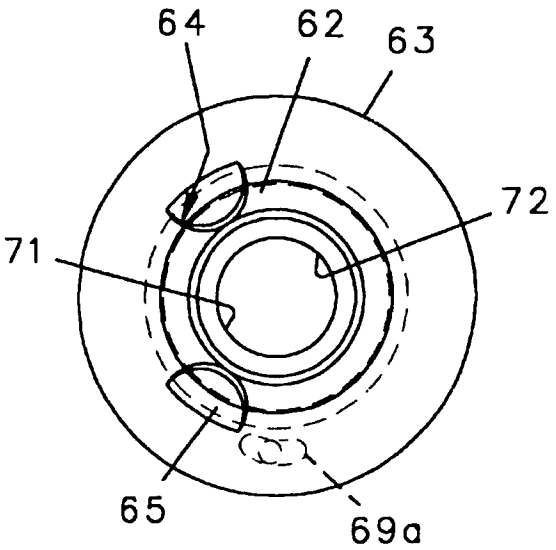
FIG. 4 is a top plan view of the bit holder shown in FIG. 3.
Figure 3:
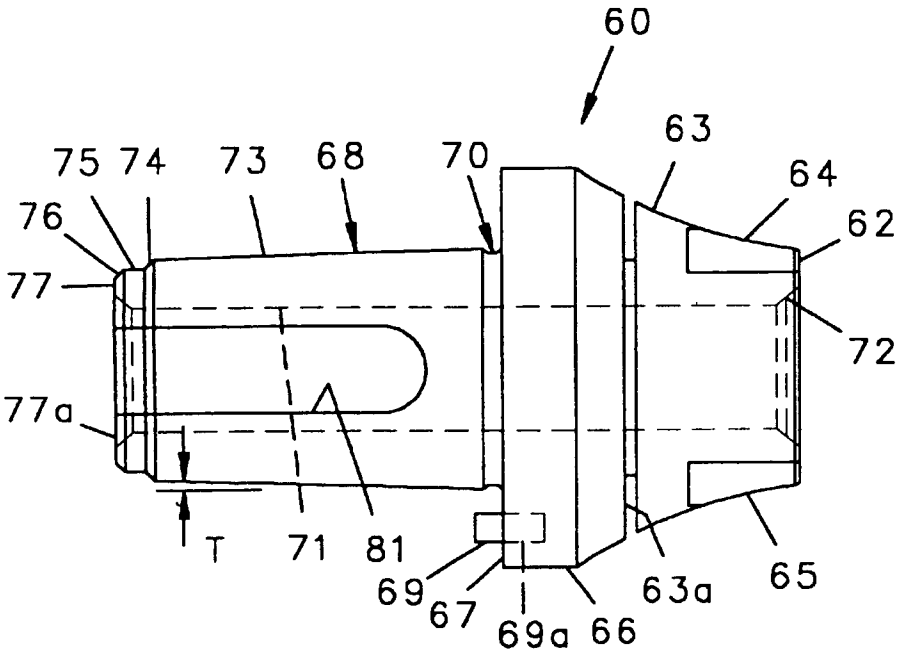
FIG. 3 is a side elevational view of a second embodiment of a bit holder constructed in accordance with the present invention.

Referring to FIG. 1, the distal end of a pneumatically operated chisel is shown in dotted line at 55, inserted in one of the notches 32C as more fully shown in FIGS. 3 and 4. The notches 32a-32d, constructed in accordance with the present invention, allow for the quick removal of the bit 21 from the bit holder 22 by applying a force having a substantial axial component thereto to the bottom side of the bit flange 28. In the preferred embodiments there may be two, three or four notches or indents 32a-d (FIG. 2, 32-d not shown) on the bit holder 22 positioned at 120 degree or 90 degree intervals, respectively, around the circumference thereof. Each notch may be straight vertically or slightly wider at surface 31 and narrows as the notch descends toward flange 33. While the use of the punch 55 on one notch is usually sufficient to remove the bit, the punch may be utilized sequentially in differing notches to balance the axial force, if necessary, to move the bit 21 out of the bit holder 22.

Referring to FIGS. 3-8, a second embodiment of the bit holder and bit block constructed in accordance with the present invention is shown and described. Beginning at FIG. 3, a second embodiment of the bit holder, generally indicated at 60, is constructed to be a press fit into the bit block, generally indicated at 61, shown in FIG. 5. The mounting of the bit holder 60 on the bit block 61 is accomplished without the aid of a retaining nut, such as shown at 52 in the first embodiment, a spring retaining clip or other fastening device utilized on the bottom of the bit block 61.

Referring to FIGS. 3 and 4, similarly to bit holder 22, the bit holder 60 has a flat annular leading surface 62, a middle tapered portion 63 behind the flat annular leading surface 62 that also includes a pair of notches 64-65, 120 degrees apart and having the same function as the notches 32a-d in the first embodiment and an annular groove 63a whose depth is calculated to insure that, in case of the bit hitting a hard discontinuity, the bit holder will break at groove 63a rather than the bit block 61 separating at its weldment to the drum or chain. Additionally, the rear of the middle tapered portion 63 is an enlarged flange portion 66 including an annular flange backside 67 similar to that shown in the first embodiment 22. A locator pin 69 extending from the flange back side 67 fits loosely into a clearance hole 69a on bit block top surface 85 (FIG. 5) for limiting the rotation of holder 60 when mounted on the bit block 61. If the bit holder breaks, the pin 69 falls out of hole 69a and does not damage the bit block 61. To the rear of the annular flange backside is the shank portion of the bit holder, generally indicated at 68. An undercut 70 between the annular flange backside 67 and the shank portion 68 assures that stress points are avoided between the shank and the enlarged flange portion when the bit holder 60 is mounted in the bit block 61. This undercut 70 also provides a breaking point if undercut 63a is not used.

Flange 66 is annular in that a bore 71 runs axially through the bit holder in a more straight forward hollow cylindrical manner than the bore 40 which extends through the bit holder 22 of the first embodiment. The leading edge of bore 71 includes a countersink 72 adjacent the flat annular leading surface 62 of the bit holder to receive a similarly shaped shank portion 25 on the bit 21 shown in FIG. 2.

In an important aspect of the present invention, a slot 81 extends through the sidewall of the shank portion from the rear semi-annular face 77 to a rounded front slot termination 82. An interference fit between the outside of tapered shank portion 73 and the like tapered bore 80 of the bit block 61 is greater than the *standard* interference *or press* fit possible if slot 81 was not in the shank portion. For example, a 1½ inch diameter shank without a slot would ordinarily have about 0.001-0.003 inch *standard* interference. With slot 81, the same size shank may have about 0.005-[012] *0.012* inch interference in the portion including the slot 81. As the distal end 77 of the shank portion 68 is positioned in the tapered bore 80 of bit block 61, the slot allows the now C-shaped portion of the shank to contract its outer diameter radially to ease the insertion of the bit holder in the bit block bore 80. This slotted portion of the shank 81 allows the C-shaped portion of the shank to act as a very strong radial spring, similarly to a hollow spring steel roll pin. The portion of shank 68 forward of slot 82 provides a 360 degree radial interference fit with the bit block bore 80, and may be greater than, equal to, or less than an interference fit at the portion of the shank at 101. The length of the slot 81 with respect to the length of the shank portion 68 may be varied depending upon the application proposed for the bit, bit holder and bit block assembly in order to optimize the operation of same. The slot 81 may, when desired, extend all the way to the rear annular flange back side 67 of the front tapered shank portion of the bit holder 60. The longer the slot, the less spring action force of shank 68. A smaller width slot provides a greater spring force. The taper for the shank 73 and bore 80 is preferably 1 degree on each side, but may be more or less, such as 2 to 4 degrees per side or ¼ to ¾ degree per side, if desired. The smaller taper such as 1 degree has a longer length of interference fit engagement and produces more radial pressure for the same axial force exerted upon it than a two degree taper for the same press fit values.

Figure 6:
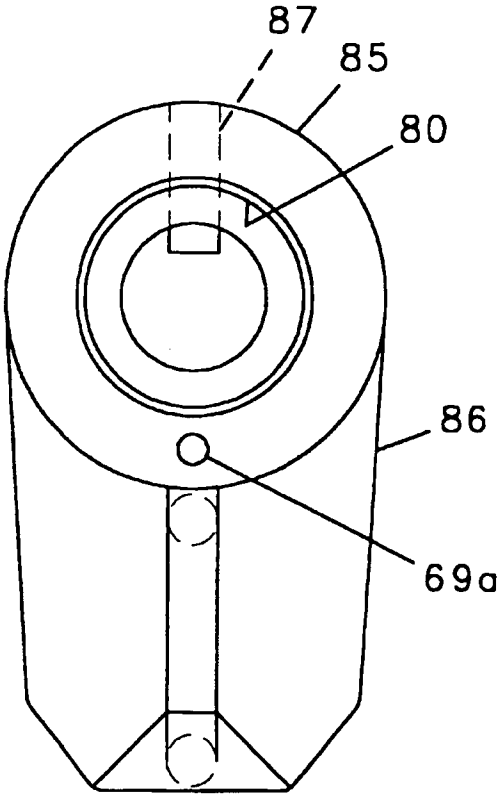
FIG. 6 is a top plan view of the bit holder shown in FIG. 5.
Figure 5:
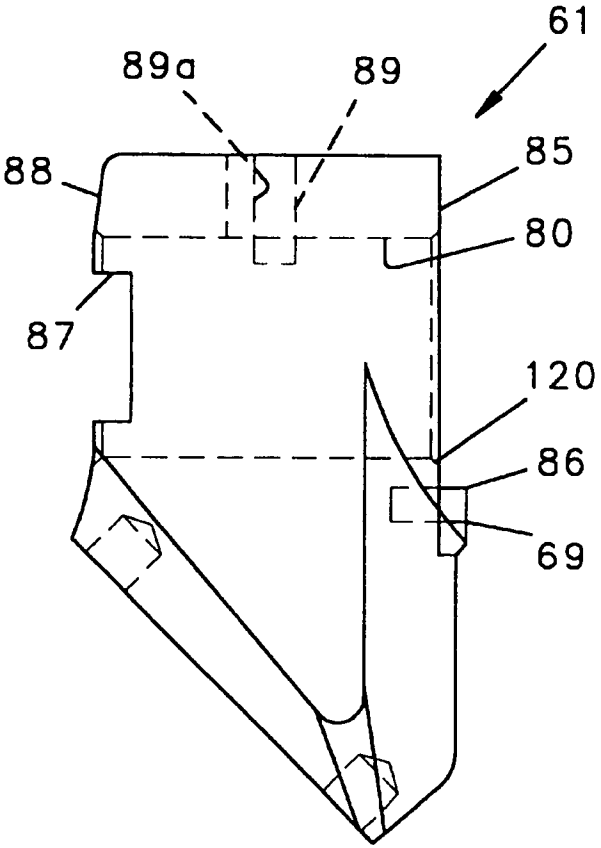
FIG. 5 is a side elevational view of a second embodiment of a bit block for retaining the bit holder shown in FIGS. 3 and 4.

Referring to FIGS. 5 and 6, bit block 61 is similar to bit block 23 with the exception that the bit block bore 80 is tapered on the order of about 1 to 4 degrees per side or 2 to 8 degrees of included angle, unlike straight bore 49. A second locator pin 89 may be mounted in a bore 89a to extend slightly into the bore 80 of the bit block 61. In use pin 89 is about ½ inch in diameter and extends into slot 81 of the bit holder slot about 3/16 inch to keep the bit holder 60 from rotating in the bit block 61 and to align the slot 81 in the bit block. A clearance hole 69a on top flat surface 85 allows the locator pin in 69 (FIG. 3) to be positioned loosely therein. An annular slot 87 is formed across the bottom portion of the bit block tail surface 88, otherwise, bit block 61 is very similar to bit block 23 in construction.

Figure 8:
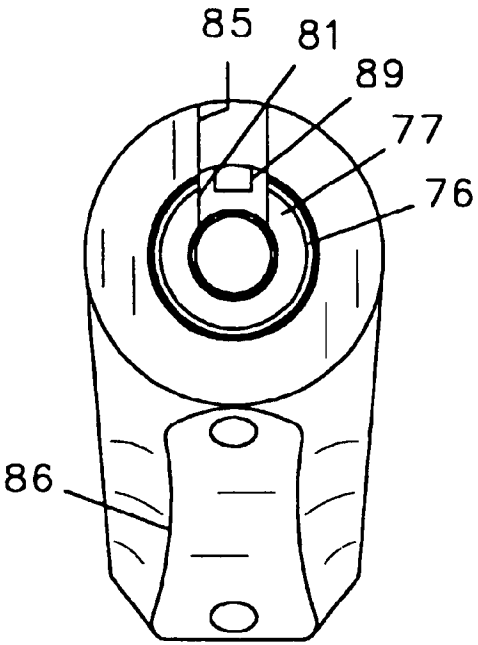
FIG. 8 is a bottom plan view of the second embodiment shown in FIG. 7.
Figure 7:
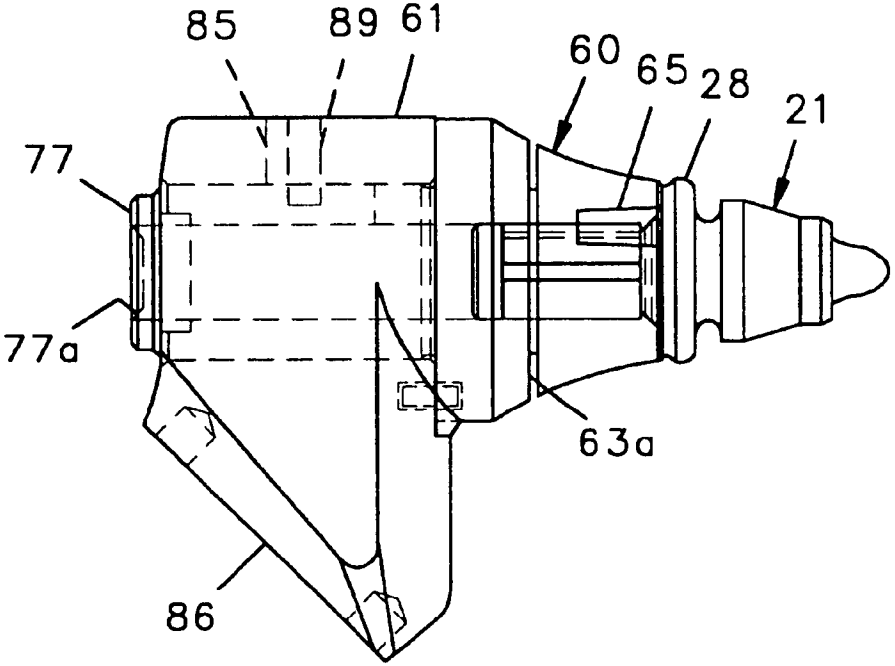
FIG. 7 is a side elevational view of the second embodiment including a bit, bit holder and bit block assembly.

Referring to FIGS. 7 and 8, the bit 21 and the second embodiments of the bit holder 60 and bit block 61 are shown in assembled condition with the exception of the modification in the bit block 61 to provide a slot 85 positioned in the outer portion of bit block 61 to more easily allow the insertion of tools in the rear of the bit block 61 to drive the bit 21 from the bit holder 60.

FIG. 8 shows the bottom of the assembly including the flat planar mounting pad 86 which mounts to the rotating wheel or moving track on which the assembly is positioned. As one can see from FIGS. 7 and 8 there is no bolt, retaining pin or other retaining means to maintain the bit holder in the bit block. Additionally, force may be applied to the distal end surface 77 of the bit holder 60 to drive the bit holder out of the bit block 61. As with the first embodiment of the present invention, the notch 65 in the front tapered portion of the bit holder 60 allows a chisel (not shown) or other such device to apply force on the back side-of the bottom flanged portion 28 of bit 21 to drive the bit out of the bit holder. Again, no bolts, retaining pins, retaining rings or the like are necessary between the bit holder 60 and the bit block 61.

Figure 10:
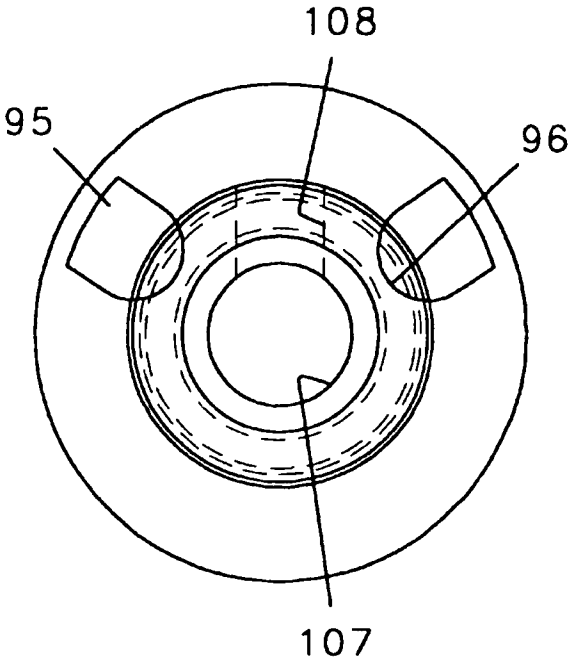
FIG. 10 is a top plan view of the bit holder shown in FIG. 9.
Figure 9:
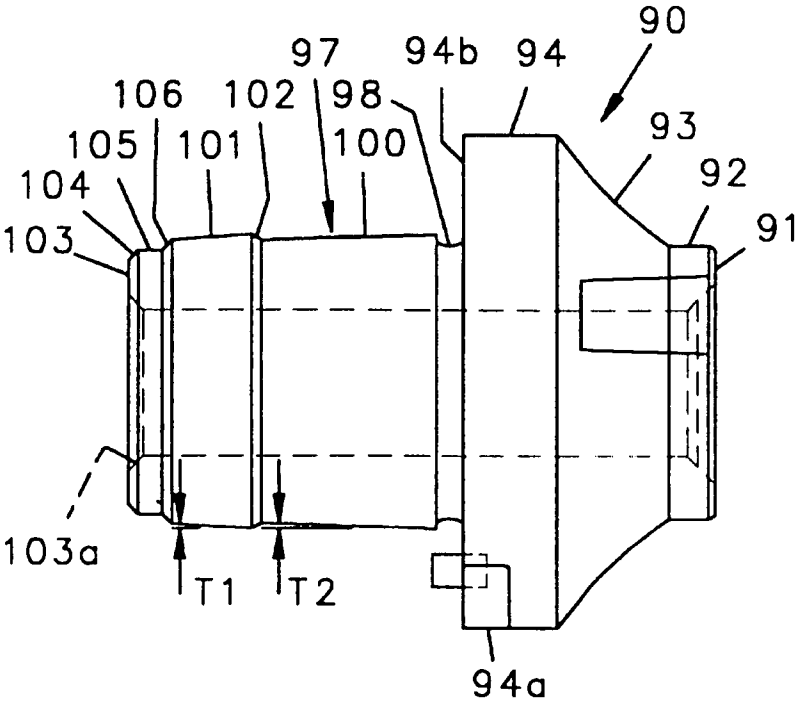
FIG. 9 is a side elevational view of a third embodiment of a bit holder constructed in accordance with the present invention.

Referring to FIGS. 9 and 10, a third embodiment of the bit holder of the present invention, generally indicated at 90, is similar to the second embodiment bit holder 60 with two exceptions to be discussed below. The forward portion of the bit holder 90 including the leading flat annular surface 91, a cylindrical front collar portion 92, the middle tapered portion 93 and the enlarged flange portion 94 perform similar functions to the forward portion of the bit holder of the second embodiment 60. Also, a pair of notches 95, 96 perform an identical function to the notches 64, 65 of the second embodiment. The forward portion of the bit holder of the third embodiment is somewhat more compact axially than the second embodiment. Another difference in the third embodiment of the present invention is the construction of the shank portion, generally indicated at 97.

The shank portion 100 is also tapered as is the shank portion 68 in FIG. 3 with approximately 1 degree of taper per side as shown at $T_1$ in FIG. 9. The shank portion also includes an undercut section 98 between the back side 94b of the enlarged flange portion and the shank portion 97 to avoid sharp areas of stress when mounting the bit holder 90 in a bit block such as that shown at 61. This portion of the shank could also be designed in either embodiment using a radius at 98 and providing sufficient relief at countersink 120 (FIG. 5) in bit block 61. In an important aspect of the third embodiment of the present invention, the tapered outermost surface of the shank is divided into a front tapered portion 100 and a rear tapered portion 101. In this third embodiment 90, shoulder 102 is formed between the front tapered portion 100 and the rear tapered portion 101. The distal portion of the shank 77 (FIG. 7) is constructed identically to that of the second embodiment with a rear face 103 a distal chamfer 104 a cylindrical tail portion 105, a transition chamfer 106 and rear tapered portion 101. Likewise, the bit holder of the third embodiment may include a central bore 107 therethrough and a slotted portion 108 (FIG. 10) similar to the slot 81 (FIG. 3) of the second embodiment 60. Slot 108 allows for a greater interference fit between rear taper 101 and bit block bore 80 (FIG. 5). In the third embodiment 90, the shoulder 102 reduces the interference fit on opposing sides from about 0.009 at 101 to about 0.002 inch between the frontal portion of slot 108 and undercut 98. The rear taper 101 and the front taper 100 are preferably identical, in this embodiment 1 degree. However, these tapers can vary as discussed previously above.

Identical smaller tapers give a longer taper contact at each end of the shank. If the angle of the taper at portion 100 is greater than the angle of the taper at portion 101, the axial length of contact between taper portion 100 and bore 80 of block 61 will be lessened. Also, a convex surface may be substituted for the tapers 100 and 101 with the result being less surface contact between the holder shank 100, 101 and block bore 80.

The shoulder 102 assures that the portion of the front taper 100 immediately adjacent the shoulder 102 does not touch the bore 80 of the bit block 61 as the bit holder is driven into the bit block. As the bit holder is further driven into the bit block and the diameter of front taper 100 increases until interference contact is made adjacent the forward end of taper 100 where the 100 percent circumferential surface is located The slot 108 decreases in width mostly in press fit zone 101 to allow the bit holder to be driven into the bit block. The position at which the front taper 100 achieves an interference fit with the bit block bore 80 is approximately that position shown in FIG. 11, i.e., about ¼ to ⅝ inch. The interference fit between the taper portions 100-101 and bore 80 maintain the bit holder in fixed mounted position in bore 80. The use of pin 89 which extends through bore 89a into the bore 80 (and slot 108 when the holder is inserted in the block) assures that proper alignment and minimal rotation occurs between the holder 90 and the bit block 61. However, when using greater interference fit on taper portion 101, no pin may be required in certain applications.

Figure 11:
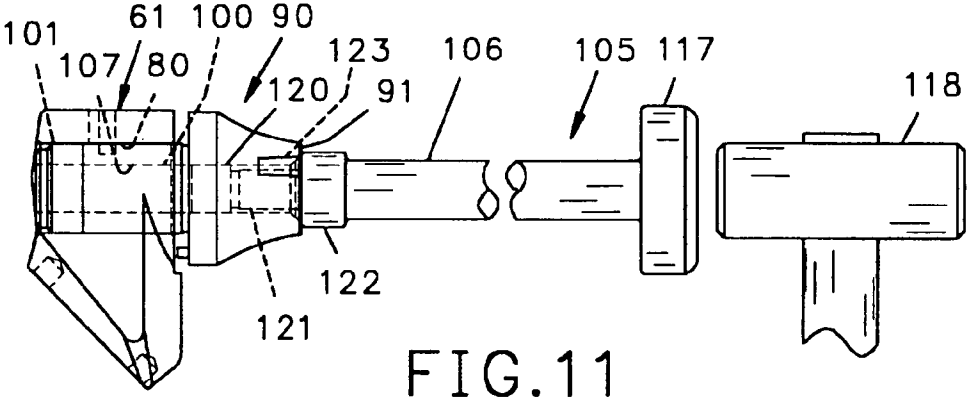
FIG. 11 is a side elevational view of the third embodiment bit holder being manually hammered into its bit block.
Figure 11A:
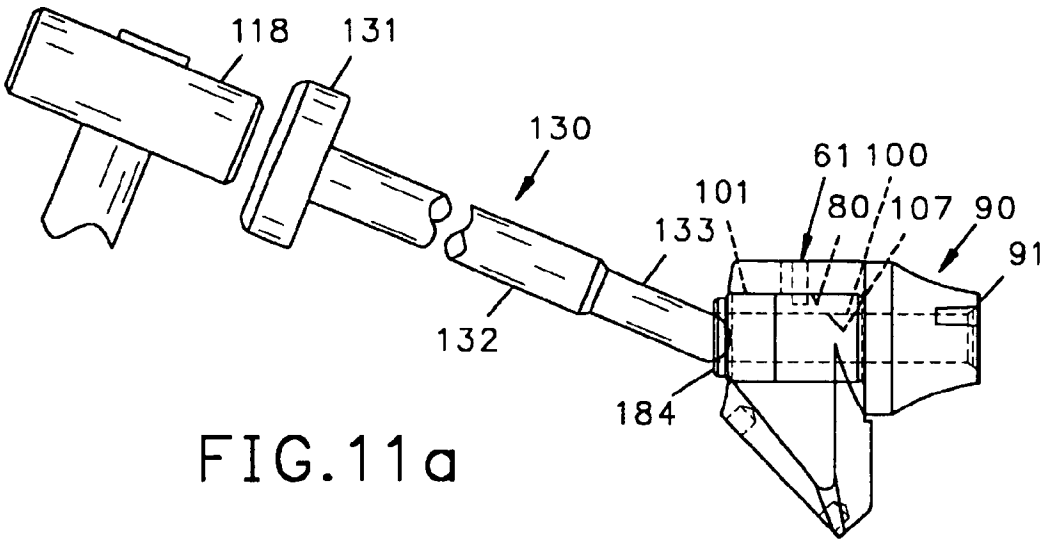
FIG. 11a is a side elevational view of the third embodiment bit holder being manually hammered out of its bit block.

Referring to FIGS. 11 and 11a, a means for mounting the bit holders of the present invention in their respective bit blocks is shown at FIG. 11, and a means for demounting or removing the bit holders from their respective bit blocks is shown at FIG. 11a. In FIG. 11, the bit holder 90 or bit holder 60 are substantially driven into the bit block 61 with the use of a first drive pin, generally indicated at 105, that includes an elongate shank portion 106 having a slip fitting cylindrical distal end 120 which loosely fits in the bore 107 (FIG. 10) of the bit holder. A reduced shaft portion 121 may be positioned mediate the distal slip fitting cylindrical portion 120 and an enlarged cylindrical portion stop member 122 including an annular face 123 thereon adapted to matingly engage the front annular flat surface 91 of the bit holder. An enlarged head portion 117 absorbs the blows of a hammer 118, which strikes the same to drive the press fit shank portion 97 (FIG. 9) of the bit holder 90 into the bore 80 of the bit block 61. The slip fitting distal cylindrical portion 120 and the annular face 123 of the drive pin 105 assures that the bit holder 90 will be accurately positioned-to drive same into the bore 80 of the bit block 61 without harming any potential annular inserts, such as shown at 163 in FIG. 12 positioned at the upper flat annular surfaces of either the bit holder or the bit block. The hardened inserts, being more brittle than the softer ductile material of the remainder of the bit block 61 and bit holder 90 will be more likely to be damaged during insertion of the bit holder 90 in the bit block 61 if a non-close fitting drive pin were used rather than the preferred embodiment drive pin 105.

Referring to FIG. 11a, a second drive pin, generally indicated at 130, is utilized to remove or drive out the bit holder 90, or bit holder 60 of the present invention from the bit block 61. Drive pin 130 includes an enlarged head portion 131 for accepting the blows of the hammer 118 previously mentioned. The shaft portion 132 includes a slightly reduced diameter distal end 133 having a semispherical tip 134 of larger diameter than the bore 107 of the bit holder 90.

In operation, the semispherical distal tip 134 is 10 positioned on the central bore 107 of the bit holder 90 at a countersink 77a (FIG. 7) on its rearward distal end 103. Since the semispherical end 134 is larger in diameter than the central bore 107, it allows the drive pin 130 to be positioned in other than a coaxial position with the central bore 107 of the bit holder 90. Countersink 77a provides for additional engagement between the distal end of the tool 130 and the bit holder. This provides positioning the drive pin around combinations of bit, bit holders and bit blocks mounted adjacent the bit holder that is being removed from its respective bit block. The hammer 118 striking the enlarged end 131 of the drive pin provides an axially oriented component of force to drive the press fit bit holder 90 outwardly of the bore 80 of the bit block 61. When needed an anti-seize grease is applied to the mating parts for easier assembly and disassembly.

Figure 12:
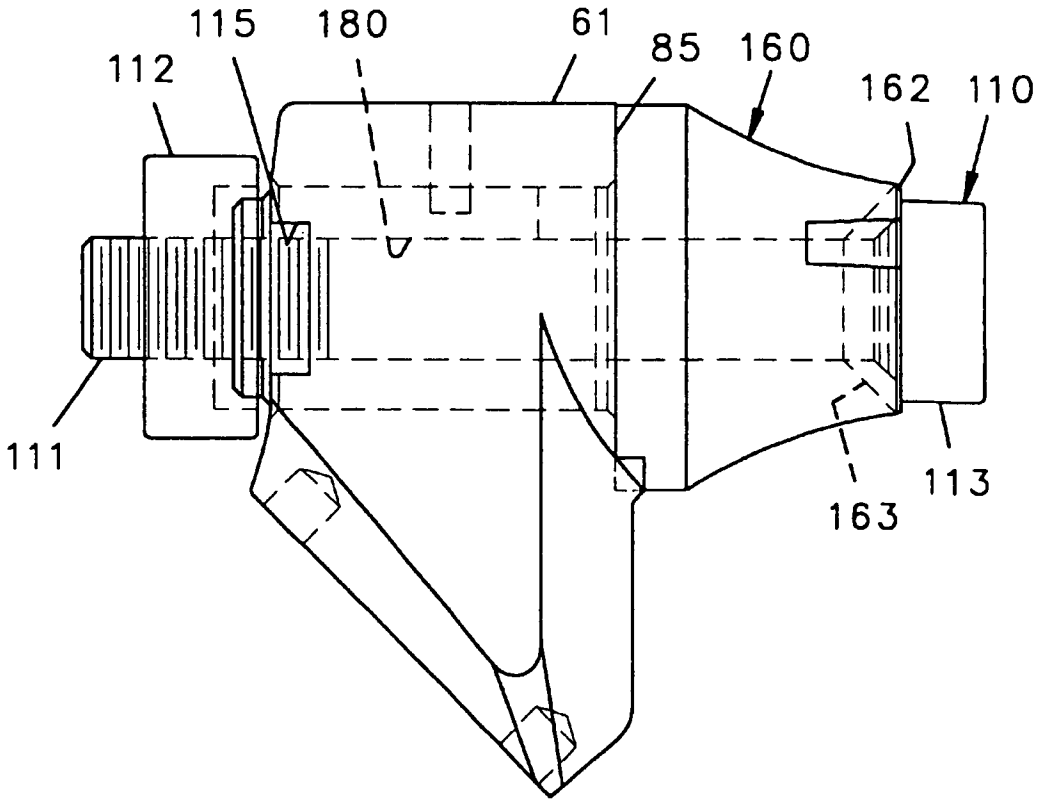
FIG. 12 is a side elevational view of a fourth embodiment combination bit block/bit holder utilizing a long bolt and bottom nut to press fit the bit holder onto the bit block.

Referring to FIG. 12, a second means of inserting the bit holder 160 into the bit block 61 is shown. This second insertion means includes a threaded bolt, generally indicated at 110, including a threaded portion 111, which extends through the bore 180 of the bit holder 160 and out the distal end thereof. A specialized nut 112 is threaded on the threaded distal end of the bolt 110 until contact is made with the rear of the bit block. Then, nut 112 is retained in a non-rotating position by a wrench or by means between the nut and the back side slot 115 of the bit block 61. Then the hexagonal front bolt portion 113 of the bolt is rotated with the threads 111 engaging the internal threads on the nut 112 such that the hex head 113 drives the front face 162 of the bit holder, and thus the remainder of the bit holder 160, into the bit block 61 until the back side annular flange 67 (FIG. 3) seats on the front face 85 of the bit block 61. The front face 162 of bit holder 160 includes a hardened frustoconical tungsten carbide insert 163 disclosed in U.S. patent application Ser. No. 09/121,726.

While four embodiments of the present invention have been shown and described, it will be apparent to those skilled in the art that changes and modifications may be made without departing from the true spirit and scope of the present invention. It is the intent of the appended claims to cover all such changes and modifications which fall within the true spirit and scope of the invention.

What is claimed:

1. In an assembly for use in road milling, trenching and mining equipment including a bit, said bit holder and a bit block, said bit being mountable in a first bore through said bit holder and said bit holder being mountable in a second bore through said bit block, said bit holder and bit block, in combination, comprising:

a generally frustoconical bit holder front portion terminating at an annular flange and a generally cylindrical bit holder shank portion extending axially rearwardly from said annular flange defining an annular sidewall, an elongate slot radially through said sidewall extending axially from a distal end of said shank and terminating between said distal end and said front portion defining a C-shape portion of said shank, an outer surface of said C-shape portion providing interference with said second bore on said bit block sufficient to maintain said bit holder on said bit block during use.

2. The assembly as defined in claim 1 wherein said C-shape portion of said shank is resiliently collapsible diametrically for providing said interference with said bit block bore.

3. The assembly as defined in claim 1 wherein said C-shape portion of said shank is resiliently collapsible when said bit holder is mounted on said bit block for absorbing radial forces directed to said bit holder.

4. The assembly as defined in claim 1 wherein said shank outer diameter adjacent said front portion annular flange is smaller than said bit block axial bore adjacent a top face of said bit block for allowing resilient absorption of radial forces directed to said bit holder.

[5. The assembly as defined in claim 1 wherein said interference is greater than a standard press fit.]

[6. A bit holder for use in road milling, trenching and mining equipment as part of an assembly including a bit, said bit holder and a bit block, said bit being mountable in a first bore through said bit holder and said bit holder being mountable in a second bore through said bit block, said bit holder comprising:

a generally frustoconical front portion terminating at an annular flange and at least one generally cylindrical shank portion extending axially rearwardly from said annular flange defining an annular sidewall, an elongate slot radially through said sidewall extending axially from a distal end of said shank and terminating between said distal end and said front portion defining at least one angular segment of said shank being less than 360 degrees in circumferential length, an outer surface of said angular segment providing interference with said second bore on said bit block sufficient to maintain said bit holder in said bit block during use.]

[7. The bit holder as defined in claim 6 wherein said angular segment of said shank is resiliently collapsible diametrically for providing said interference with said bit block bore.]

[8. The bit holder as defined in claim 6 wherein said angular segment of said shank is resiliently collapsible when said bit holder is mounted on said bit block for absorbing radial forces directed to said bit holder.]

[9. The bit holder as defined in claim 6 wherein said shank outer diameter adjacent said front portion annular flange is smaller than said bit block axial bore adjacent a top face of said bit block for allowing resilient absorption of radial forces directed to said bit holder.]

[10. The bit holder as defined in claim 6 wherein said interference is greater than a standard press fit.]

[11. A bit holder for use in road milling, trenching and mining equipment as part of an assembly including a bit, said bit holder and a bit block, said bit being mountable in a first bore through said bit holder and said bit holder being mountable in a second bore through said bit block, said bit holder comprising:

a generally frustoconical front portion terminating at an annular flange and a generally cylindrical shank portion extending axially rearwardly from said annular flange defining an annular sidewall, an elongate slot radially through said sidewall extending axially from a distal end of said shank and terminating between said distal end and said front portion defining a C-shape portion of said shank, an outer surface of said C-shape portion providing interference with said second bore on said bit block sufficient to maintain said bit holder in said bit block during use.]

[12. The bit holder as defined in claim 11 wherein said C-shape portion of said shank is resiliently collapsible diametrically for providing said interference with said bit block bore.]

[13. The bit holder as defined in claim 11 wherein said C-shape portion of said shank is resiliently collapsible when said bit holder is mounted on said bit block for absorbing radial forces directed to said bit holder.]

[14. The bit holder as defined in claim 11 wherein said shank outer diameter adjacent said front portion annular flange is smaller than said bit block axial bore adjacent a top face of said bit block for allowing resilient absorption of radial forces directed to said bit holder.]

[15. The bit holder as defined in claim 11 wherein said interference is greater than a standard press fit.]

*16. The bit holder as defined in claim 1, wherein said bit holder further includes a means disposed in said front portion of said bit holder beginning adjacent a front face thereof to enable quick removal of said bit.*

*17. The bit holder as defined in claim 16, wherein said means is at least one of one of a notch, flat and detent.*

*18. The bit holder as defined in claim 17, wherein said at least one of said one of a notch, flat and detent is a notch.*

*19. The bit holder as defined in claim 18, wherein said bit holder includes a predetermined plurality of notches.*

*20. The bit holder as defined in claim 19, wherein said predetermined plurality of notches is at least two.*

*21. The bit holder as defined in claim 19, where said predetermined plurality of notches is at least three.*

*22. The bit holder as defined in claim 21, wherein said three notches are positioned at about 120° apart.*

*23. The bit holder as defined in claim 19, where said predetermined plurality of notches is at least four.*

*24. The bit holder as defined in claim 23, wherein said four notches are positioned at from 90° apart.*

*25. The assembly as defined in claim 1 wherein said interference extends from about 0.005 to 0.012 inch in a portion of said shank including said elongate slot.*

* * * * *